(12) United States Patent
Shimizu et al.

(10) Patent No.: US 7,790,132 B2
(45) Date of Patent: Sep. 7, 2010

(54) METHOD FOR PRODUCING TRICHLOROSILANE AND METHOD FOR PRODUCING POLYCRYSTALLINE SILICON

(75) Inventors: Takaaki Shimizu, Niigata (JP); Kyoji Oguro, Niigata (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 57 days.

(21) Appl. No.: 12/203,395

(22) Filed: Sep. 3, 2008

(65) Prior Publication Data

US 2009/0060820 A1 Mar. 5, 2009

(30) Foreign Application Priority Data

Sep. 5, 2007 (JP) ............... 2007-229859

(51) Int. Cl.
*C01B 33/107* (2006.01)
*C01B 33/023* (2006.01)
*B01D 53/44* (2006.01)
*B01D 53/72* (2006.01)

(52) U.S. Cl. ............... 423/342; 423/341; 423/348; 423/349; 423/240 R; 203/29

(58) Field of Classification Search ............... 423/324, 423/341, 342, 348, 349, 240 R; 203/29
See application file for complete search history.

(56) References Cited

U.S. PATENT DOCUMENTS

| 4,372,834 A | 2/1983 | Barns et al. |
| 5,939,577 A * | 8/1999 | Wheeler et al. ............ 556/477 |
| 7,033,561 B2 * | 4/2006 | Kendig et al. ............ 423/349 |
| 2004/0052716 A1 | 3/2004 | Wakamatsu et al. |
| 2004/0131523 A1 | 7/2004 | Kendig et al. |
| 2009/0060819 A1 * | 3/2009 | Bill et al. ............ 423/342 |

FOREIGN PATENT DOCUMENTS

| EP | 0 302 604 | 2/1989 |
| JP | 2004-532786 | 10/2004 |
| WO | WO 02/100776 A1 | 12/2002 |

OTHER PUBLICATIONS

Brinson, J. Ashley, Recovery of Valuable Chlorosilane Intermediates by a Novel Waste Conversion Process, Jun. 20, 2002, US Department of Energy (Office of Scientific and Technical Information), DOE/AL/99566-4 (Report Number), p. 5.*
U.S. Appl No. 12/135,487, filed Jun. 9, 2008, Shimizu et al.
U.S. Appl No. 12/190,229, filed Aug. 12, 2008, Shimizu et al.
U.S. Appl No. 12/190,151, filed Aug. 12, 2008, Shimizu et al.

* cited by examiner

*Primary Examiner*—Timothy C Vanoy
*Assistant Examiner*—Diana J Liao
(74) *Attorney, Agent, or Firm*—Oblon, Spivak, McClelland, Maier & Neustadt, L.L.P.

(57) ABSTRACT

The present invention includes a step of separating an effluent produced in a hydrogenation step of making tetrachlorosilane (STC) react with hydrogen into trichlorosilane (TCS), into a chlorosilane fraction containing a hydrocarbon and a TCS fraction, and a chlorination step of making the chlorosilane fraction containing the hydrocarbon react with chlorine to form STC and a substance containing a chlorinated hydrocarbon, wherein the effluent containing STC produced in the chlorination step is circulated to the hydrogenation step. In the chlorination step, the chlorosilane fraction containing a hydrocarbon (capable of containing hyper-hydrogenated chlorosilanes) having a boiling point close to TCS is hyper-chlorinated to be converted and acquire a higher boiling point, which facilitates the hyper-chlorinated chlorosilanes and the hyper-chlorinated hydrocarbons to be separated into high concentration, and increases the purity of TCS to be finally obtained.

16 Claims, 3 Drawing Sheets

METHOD FOR PRODUCING TRICHLOROSILANE AND METHOD FOR PRODUCING POLYCRYSTALLINE SILICON

BACKGROUND OF THE INVENTION

1. Field of the Invention

The present invention relates to a technology for producing trichlorosilane (TCS) of high purity, and relates to a method for producing polycrystalline silicon using the method for producing the trichlorosilane.

2. Description of the Related Art

In a process for producing high-purity polycrystalline silicon of a semiconductor grade, generally a "Siemens method" of reducing trichlorosilane (TCS) gas and depositing the product on a silicon rod has been widely used.

As for the Siemens method, National Publication of International Patent Application No. 2004-532786 (Patent Document 1) discloses an invention relating to a method of producing polycrystalline silicon, which newly includes a step of converting disilane ($H_nCl_{6-n}Si_2$: n is a value of 0 to 6) that exists in a gaseous effluent coming out from a CVD process for producing a polycrystalline silicon, into mono-silane, in a hydrogenation reaction vessel for converting tetrachlorosilane (STC) into trichlorosilane (TCS). The method is evaluated to have advantages of enhancing a yield of a hydrogenation process by combining a hydrogenation reaction with a thermal decomposition reaction of disilane in the same reaction vessel which is the hydrogenation reaction vessel, and the like. TCS produced in the hydrogenation step is recovered, and can be recycled to a step of depositing the polycrystalline silicon.

Incidentally, a by-product mixture produced when polycrystalline silicon is deposited by reacting TCS with hydrogen also includes a poly-silane ($H_{2(n+1)-m}Cl_mSi_n$: n is an integer of 3 or 4 and m is an integer of 0 to 2(n+1)), other than disilane having a silicon atom number n of 2. Accordingly, when these poly-silanes (n=2 to 4) can be effectively used, the by-product mixture produced in the step of depositing the polycrystalline silicon is recycled as a raw material for use in producing the polycrystalline silicon, and more specifically, the by-product mixture is facilitated to be recycled as the TCS, and a yield of the production process is further enhanced.

In other words, a conventional method of producing polycrystalline silicon including a method disclosed in National Publication of International Patent Application No. 2004-532786 (Patent Document 1) has a room to be improved in a process of converting the above described by-product mixture into the TCS as the raw material for use in producing the polycrystalline silicon.

In addition, in order to produce high-purity polycrystalline silicon of a semiconductor grade, it is required to enhance the purity of TCS which is to be the raw material. As a result, it is needed to prepare a step for removing impurities in the TCS and the by-product which are circulated and used in the process for producing the polycrystalline silicon. Accordingly, it is extremely important from a practical standpoint to design the process so as to facilitate the removal of the impurities from the TCS and the by-product which are circulated and used in the process for producing the polycrystalline silicon.

SUMMARY OF THE INVENTION

The present invention is designed with respect to such a problem, and is directed at providing a method which can allow high-purity trichlorosilane (TCS) to be obtained from a by-product produced through a deposition reaction of polycrystalline silicon, and can further enhance a yield in a process for producing polycrystalline silicon.

In order to solve such a problem, a method for producing trichlorosilane according to the present invention includes a hydrogenation step of making tetrachlorosilane (STC) react with hydrogen into trichlorosilane (TCS), a step of separating an effluent from the hydrogenation step into a chlorosilane fraction containing a hydrocarbon and a TCS fraction, and a chlorination step of making the chlorosilane fraction containing the hydrocarbon produced in the separation step react with chlorine to form STC and a substance containing a chlorinated hydrocarbon, wherein the effluent containing STC produced in the chlorination step is circulated to the hydrogenation step.

The method for producing trichlorosilane according to the present invention can make the chlorosilane fraction containing the hydrocarbon separated in the separation step to contain a hyper-hydrogenated chlorosilane.

In addition, the method for producing the trichlorosilane according to the present invention includes an STC purification step of separating the chlorinated hydrocarbon from the effluent containing STC produced in the chlorination step, wherein an STC fraction after having been purified is circulated to the hydrogenation step.

Furthermore, the method for producing the trichlorosilane according to the present invention includes a step of removing a donor impurity and an acceptor impurity contained in the effluent from the hydrogenation step, and the effluent after the impurities have been removed therefrom may be separated into the chlorosilane fraction containing the hydrocarbon and the TCS fraction, in the separation step.

Chlorine gas can be used as a chlorination agent in the chlorination step, and the chlorination reaction is preferably caused by a photo-chlorination reaction.

A method for producing polycrystalline silicon according to the present invention includes a CVD step of making TCS produced in the above described method for producing the trichlorosilane to react with hydrogen to deposit polycrystalline silicon on a base material, wherein a by-product mixture which is produced in the CVD step and includes poly-silane represented by a chemical formula $H_{2(n+1)-m}Cl_mSi_n$ (where n is an integer of 2 to 4 and m is an integer of 0 to 2(n+1)) is chlorinated into an STC-containing substance in the chlorination step.

An amount of hydrocarbons which are distilled off from the hydrogenation step for STC is very small. However, as the amount of used chlorosilanes other than TCS increases, the hydrocarbons are gradually concentrated by being circulated, and may possibly contaminate TCS. In order to remove the hydrocarbons, a large quantity of chlorosilanes including TCS needs to be removed at the same time, which limits an application range of the chlorosilanes.

A method for producing trichlorosilane according to the present invention converts hydrocarbons in the chlorination step so that the hydrocarbons acquire greatly higher boiling points, consequently facilitates TCS, hyper-chlorinated chlorosilanes and hyper-chlorinated hydrocarbons to be separated into high concentration, and increases the purity of TCS to be finally obtained even when a utilization of chlorosilanes is improved. On the other hand, the coexisting hyper-hydrogenated chlorosilanes are also chlorinated at the same time into hyper-chlorinated chlorosilanes and finally into STC.

As a result, when TCS produced with a method according to the present invention is used as a raw material for use in producing polycrystalline silicon, the contamination of polycrystalline silicon by carbon is reduced.

In addition, the method for producing trichlorosilane according to the present invention includes removing donor impurities and acceptor impurities which are contained in chlorosilane in a circulation cycle of the process for producing the TCS, and accordingly does not need to take out a large amount of chlorosilane to the outside of the system when removing the donor impurities and the acceptor impurities from the process of producing the TCS in order to highly purify the TCS.

As a result, an efficiency of the process for producing the TCS is enhanced.

Thus, the present invention can highly purify trichlorosilane (TCS) obtained from a by-product mixture produced in a step of depositing polycrystalline silicon, and can further enhance a yield of a process for producing the polycrystalline silicon.

DESCRIPTION OF THE PREFERRED EMBODIMENTS

A method for producing trichlorosilane according to the present invention will now be described below with reference to the drawings. In the following description, polycrystalline silicon which has been produced by using trichlorosilane as a raw material obtained through the method according to the present invention will be described as high-purity polycrystalline silicon of a semiconductor grade, but the present invention is also effective in obtaining polycrystalline silicon of a solar cell grade or the like.

Figure 1:
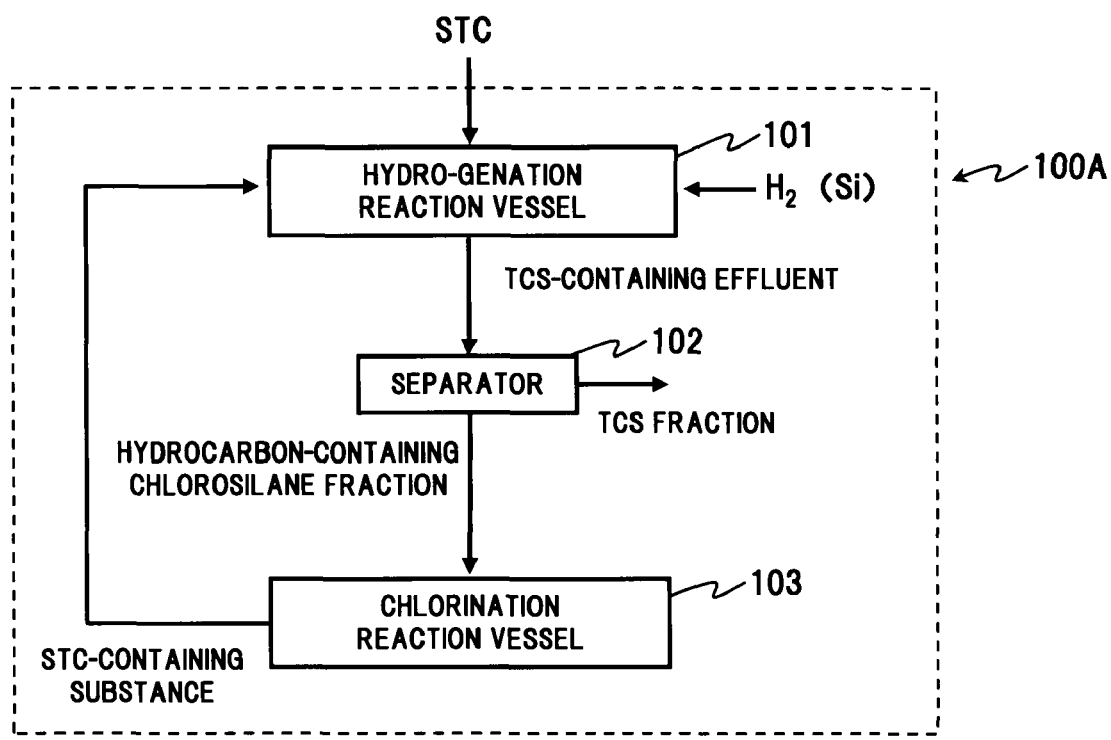
FIG. 1 is a view for describing a basic configuration (process) of a method for producing TCS according to the present invention.

[Basic configuration]: FIG. 1 is a view for describing a basic configuration (process) of a method for producing trichlorosilane according to the present invention. The process for producing TCS 100A includes a hydrogenation step (hydrogenation reaction vessel 101) of making tetrachlorosilane (STC) react with hydrogen into trichlorosilane (TCS), a step (separator 102) of separating an effluent containing TCS produced in the hydrogenation step into a chlorosilane fraction containing hydrocarbons and a TCS fraction, and a chlorination step (chlorination reaction vessel 103) of making the chlorosilane fraction containing hydrocarbons produced in the separation step react with chlorine to form STC and a substance containing chlorinated hydrocarbons, wherein the effluent containing STC produced in the chlorination step is circulated to the hydrogenation step.

STC supplied to the hydrogenation reaction vessel 101 may include STC contained in a by-product mixture which has been discharged from a CVD reactor for depositing polycrystalline silicon, which is installed outside the system. In this case, the process for producing TCS can produce high-purity trichlorosilane (TCS) from a by-product mixture produced in a step of depositing polycrystalline silicon, can recycle the high-purity TCS to the step of depositing the polycrystalline silicon, and consequently enhance the yield of a process for producing the polycrystalline silicon. Specific aspects of such a process for producing polycrystalline silicon will be described later.

In a hydrogenation step, a hydrogenation reaction proceeds to convert STC into TCS. The reaction in the hydrogenation step is classified generally into a hydrogenation reaction in a comparatively high temperature range of approximately 600 to 1,200° C., and a hydrogenation reaction in a comparatively low temperature range of approximately 400 to 600° C. (for instance, under pressure of approximately 100 to 600 psig) (see, for instance, National Publication of International Patent Application No. 2004-532786 (Patent Document 1), Japanese Patent Laid-Open No. 58-217422 (Patent Document 2) and the like). The hydrogenation reaction in the temperature range of approximately 600 to 1,200° C. is a gas-phase homogenous reaction, and proceeds according to the following reaction formula (1). The hydrogenation reaction in the temperature range of approximately 400 to 600° C. is a fluidized bed reaction, and proceeds according to the following reaction formula (2) and the following reaction formula (3) which occurs as a result of the following reaction formula (2).

$SiCl_4 + H_2 \rightarrow SiHCl_3 + HCl$           Reaction formula (1)

$3SiCl_4 + 3H_2 \rightarrow 3SiHCl_3 + 3HCl$ $Si + 3HCl \rightarrow SiHCl_3 + H_2$           Reaction formula (2)

$Si + 2H_2 + 3SiCl_3 \rightarrow 4SiHCl_3$           Reaction formula (3)

Accordingly, when the hydrogenation reaction is carried out in the temperature range of approximately 600 to 1,200° C., silicon does not need to be supplied. However, when the hydrogenation reaction is carried out in the temperature range of approximately 400 to 600° C., the silicon is supplied to the reaction, and the STC and other compounds are hydrogenated in the presence of the silicon.

When the fluidized bed is used, a hydrocarbon is produced as a by-product from impurities carbon contained in metallurgical silicon which has been filled in the fluidized bed, and in a reaction in the high temperature range, a hydrocarbon is produced as a by-product from carbon contained in a reaction equipment. Thus produced hydrocarbon of the by-product is particularly hydrocarbons having a boiling point close to that of chlorosilane and having about 5 carbon atoms, and typically is isopentane, which contaminates the reaction effluent. Here, isopentane is a hydrocarbon which has a boiling point between boiling points of dichlorosilane and TCS.

The effluent containing TCS discharged from the hydrogenation reaction vessel 101 is sent to a separator 102, is separated into a chlorosilane fraction containing hydrocarbons and a TCS fraction. The TCS fraction is withdrawn, and the chlorosilane fraction containing hydrocarbons is discharged to a chlorination step (chlorination reaction vessel 103).

In the chlorination step, STC and a substance containing chlorinated hydrocarbons are formed by making the chlorosilane fraction containing hydrocarbons (capable of containing hyper-hydrogenated chlorosilanes) supplied from the separator 102 react with chlorine, for instance, through a liquid-phase reaction in a temperature range of approximately –20 to 100° C. or a gas-phase reaction at a temperature of 400° C. or higher. Chlorine gas can be used as a chlorination agent in the chlorination step.

An advantage of providing the chlorination step is a point that hydrocarbons contained in the chlorosilane fraction (capable of containing hyper-hydrogenated chlorosilanes) containing hydrocarbons having boiling points close to that of TCS are chlorinated into compounds having much higher boiling points, and accordingly facilitates the chlorinated hydrocarbons to be separated into high concentration. As described above, a chlorosilane fraction produced in a hydrogenation step includes a very small amount of hydrocarbon compounds such as isopentane having a boiling point close to that of TCS. Isopentane, for instance, has the boiling point of 30° C., but acquires such largely elevated boiling points as 100° C. when the primary carbon is chlorinated by receiving chlorination and 85° C. even when the tertiary carbon is chlorinated by receiving chlorination.

These reactions occurring in the chlorination reaction vessel 103 will now be shown by chemical formulae below. When hydrocarbons are assumed to be isopentane ($(CH_3)_2CHCH_2CH_3$), for instance, one part of a C—H bond in isopentane is chlorinated, and 1-chloro-2-methylbutane and 2-chloro-2-methylbutane are formed, through the reaction formula (4) shown below.

$(CH_3)_2CHCH_2CH_3+Cl_2 \rightarrow CH_2ClCH_3CHCH_2CH_3+$
HCl $(CH_3)_2CHCH_2CH_3+Cl_2 \rightarrow (CH_3)_2CClCH_2$
$CH_3+HCl$     Reaction formula (4)

In the chlorination step, a hyper-hydrogenated chlorosilane can be chlorinated, and TCS or STC can be formed. As is shown in the following reaction formula (5), for instance, when the hyper-hydrogenated chlorosilane is dichlorosilane ($SiH_2Cl_2$:DCS), hydrogen of DCS is chlorinated, and TCS which is a lower-level-hydrogenated chlorosilane (in other words, hyper-chlorinated chlorosilane) is formed.

$SiH_2Cl_2+Cl_2 \rightarrow SiHCl_3+HCl$     Reaction formula (5)

In the above described reaction formula (5) is illustrated on the assumption that the hyper-hydrogenated chlorosilane is DCS, but the chlorination reaction of the Si—H bond proceeds consecutively even on other hyper-hydrogenated chlorosilanes or hyper-hydrogenated silanes, as is illustrated in the following reaction formula (6). Thus, the hyper-hydrogenated chlorosilane is sequentially converted into STC by being repeatedly circulated to the chlorination step from the hydrogenation step.

$SiH_4+Cl_2 \rightarrow SiH_3Cl+HCl$ $SiH_3Cl+Cl_2 \rightarrow SiH_2Cl_2+HCl$ $SiH_2Cl_2+Cl_2 \rightarrow SiHCl_3+HCl$ $SiHCl_3+Cl_2 \rightarrow SiCl_4+HC$ Incidentally a hyper-hydrogenated chlorosilane is contained not only in the hydrogenation step for STC, but also in an exhaust gas of a by-product produced in a CVD step for obtaining polycrystalline silicon. The hyper-hydrogenated chlorosilane can also be recirculated to the hydrogenation step for STC, and can be effectively used as a raw material for TCS.

The chlorination reaction expressed by the above described reaction formulae can be carried out through any of a liquid-phase reaction under irradiation with light, a liquid-phase reaction under the presence of a radical initiator and a gas-phase reaction at a cleavage temperature of the molecule of chlorine or higher.

A chlorination reaction (photo-chlorination) under irradiation with light is a method of forming a chlorinated hydrocarbon from a hydrocarbon and STC from a hyper-hydrogenated chlorosilane by irradiating the hydrocarbon and the hyper-hydrogenated chlorosilane with light in the presence of chlorine. The usable light has a wavelength corresponding to the absorption wavelength of a Cl—Cl bond in the molecule of chlorine, and is emitted from a light source such as a low-pressure mercury lamp, a high-pressure mercury lamp and a xenon lamp, as is described in Japanese Patent Laid-Open No. 4-202007 (Patent Document 9).

In the case of a chlorination reaction in the presence of the radical initiator, AIBN (azobisisobutyronitrile), BPO (benzoyl peroxide) or the like is used as the radical initiator. However, when the radical initiator is employed, the radical initiator is thermally decomposed into a radical, and the radical causes a chain-reaction in the molecule of chlorine to produce Cl radical. When the radical initiator is thermally decomposed, and organic fragment having a low boiling point is simultaneously formed, and becomes a contamination factor in the system. Accordingly, the organic fragment needs to be removed. For this reason, photo-chlorination without the need of using the radical initiator is preferred.

The chlorination reaction in the presence of the radical initiator can be carried out in a wide range of approximately −20° C. to 100° C., but can also be carried out in a temperature range (approximately 10 to 40° C.) at which special cooling and heat treatment are not required, because the reaction is a radical reaction and accordingly proceeds even at room temperature. Since the reaction is a liquid-phase reaction, the pressure is not restricted, but it is preferable to control the pressure into a range of atmospheric pressure to 0.2 MPa, from the viewpoint of the pressure resistance of a reaction vessel and the like.

An amount of chlorine to be introduced into a chlorination reaction vessel 103 needs to be at least a sufficient stoichiometric amount for progressing the chlorination reaction shown in the above described reaction formulae. However, because various reactions simultaneously and competitively proceed in the chlorination reactor 103, when the concentration of the reaction raw material is low, the amount of chlorine needs to be greatly excessive. For instance, chlorine of approximately 5 to 15 times of the stoichiometric amount needs to be supplied.

However, chlorine which has not reacted with silane and chlorosilane compounds because the excessive amount of chlorine has been supplied and dissolves in a liquid produced by the reaction can be recovered from the produced liquid. Accordingly, if the unreacted chlorine would be recycled as chlorine for supply, the amount of chlorine to be supplied from the outside of the system can be almost equalized to real consumption of chlorine, and a stoichiometric ratio of chlorine in the chlorination reaction vessel 103 can also be maintained to an intended condition (for instance, approximately 5 to 15 times of the stoichiometric amount).

The chlorination reactions expressed by the above described reaction formulae can be carried out through a gas-phase reaction at a cleavage temperature of the molecule of chlorine or higher (preferably through gas-phase reaction at approximately 400° C. to 600° C.), but causes more side reactions compared to a liquid-phase reaction, and accordingly is less advantageous compared to the liquid-phase method from the viewpoint of energy consumption as well.

As is illustrated later in Example 1 (FIG. 3), in the chlorination reaction vessel 103, a mixture including poly-silane represented by a chemical formula $H_{2(n+1)-m}Cl_mSi_n$ (where n is an integer of 2 to 4 and m is an integer of 0 to 2(n+1)) which is a by-product produced in a CVD step for depositing polycrystalline silicon is also chlorinated into a substance containing STC.

In a reaction in which tetrachlorosilane (STC) is formed from the poly-silane, when the poly-silane is assumed to be pentachlorodisilane ($Si_2HCl_5$), hydrogen of an Si—H bond in pentachlorodisilane is chlorinated, and simultaneously an Si—Si bond is cleaved to newly form an Si—Cl bond, through the following reaction formula (7). As a result, STC of 2 moles are produced from pentachlorodisilane.

$$Si_2HCl_5 + 2Cl_2 \rightarrow 2SiCl_4 + HCl \quad \text{Reaction formula (7)}$$

The above described reaction formula (7) is illustrated on the assumption that the poly-silane is pentachlorodisilane, but even when being hexachlorodisilane or heptachlorotrisilane, for instance, other than pentachlorodisilane, the poly-silane similarly forms STC through a reaction of forming the Si—Cl bond from the Si—H bond and forming the Si—Cl bond while cleaving the Si—Si bond.

An effluent containing STC(STC-containing substance) produced in the chlorination step is circulated to the hydrogenation step (hydrogenation reaction vessel 101), and can be recycled to be converted into TCS through a reaction of the STC component with hydrogen, which results in enhancing an efficiency of the process for producing TCS.

Furthermore, as is illustrated later in Example 1 (FIG. 3), hyper-chlorinated methyl chlorosilane can be formed from methyl chlorosilane (MeCS) in the chloriination reaction vessel 103, by making an effluent containing the MeCS produced in the hydrogenation step (hydrogenation reaction vessel 101) react with chlorine.

The reactions in the chlorination reaction vessel 103 will now be shown by chemical formulae below. Two reactions competitively proceed as are shown in the following reaction formula (4), when chlorosilane is methyl dichlorosilane ($CH_3SiHCl_2$). One is a reaction (upper formula) in which a hyper-chlorinated methyl chlorosilane ($CH_3SiCl_3$) is formed through the chlorination of an Si—H bond in methyl dichlorosilane, and the other is a reaction (lower formula) in which a hyper-chlorinated methyl chlorosilane ($CH_2ClSiHCl_2$) is formed through the chlorination of a C—H bond in a methyl group of a $CH_3$—Si bond. When excessive chlorine exists in the chlorination reaction vessel, the chlorination of the C—H bond further proceeds and a higher grade of hyper-chlorinated methyl chlorosilane is produced.

$$CH_3SiHCl_2 + Cl_2 \rightarrow CH_3SiCl_3 + HCl$$

$$CH_3SiHCl_2 + Cl_2 \rightarrow CH_2ClSiHCl_2 + HCl \quad \text{Reaction formula (8)}$$

The above described reaction formula (8) is illustrated on the assumption that methyl chlorosilane is methyl dichlorosilane ($CH_3SiHCl_2$), but even when the methyl chlorosilane is another methyl chlorosilane (for instance, $CH_3SiCl_3$, $(CH_3)_2SiHCl$, $(CH_3)_2SiCl_2$, $(CH_3)_3SiCl$ and $CH_3SiH_2Cl$), the hyper-chlorinated methyl chlorosilane is similarly produced through the chlorination reaction for the Si—H bond, and the chlorination reaction for the C—H bond in the methyl group of the $CH_3$—Si bond.

Thus hyper-chlorinated methyl chlorosilane having higher boiling points can be easily separated into high concentration, which can prevent methyl chlorosilanes from being concentrated and accumulating in the process and consequently can produce highly purified TCS. Even when the methyl chlorosilanes are removed from the system, it is avoided that a large quantity of chlorosilanes is discharged together with the methyl chlorosilanes, which enables a reduction of waste and the economical production.

Figure 2:
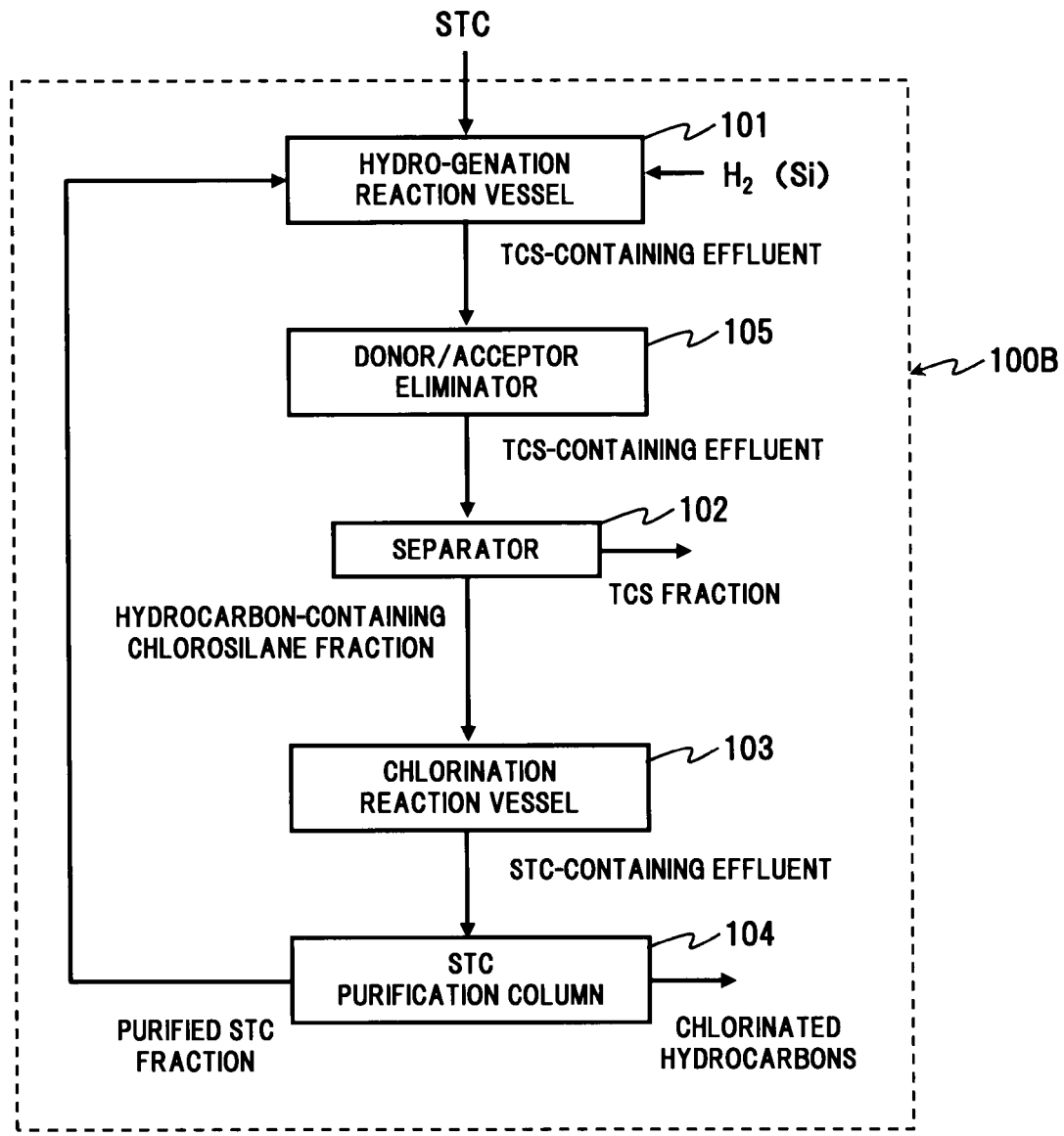
FIG. 2 is a view for describing another configuration example of a method for producing TCS according to the present invention.

[Another configuration example]: FIG. 2 is a view for describing another configuration example (process example) of a method for producing TCS according to the present invention. The process for producing TCS 100B includes an STC purification step of separating chlorinated hydrocarbons from an effluent containing STC produced in the chlorination step (STC purification column 104) and a step of removing donor and acceptor impurities contained in an effluent produced in the hydrogenation step (donor/acceptor eliminator 105), in addition to steps illustrated in FIG. 1.

The above configuration example makes the STC purification column 104 remove hydrocarbons produced in the hydrogenation reaction vessel in a form of a chlorinated hydrocarbon to purify STC, accordingly can prevent the hydrocarbons from being concentrated and accumulating in the process, and consequently can produce highly purified TCS.

The donor/acceptor eliminator 105 is installed so as to make the TCS to be produced into a raw material for producing high-purity polycrystalline silicon by removing impurities (P, As and the like) which act as a donor and impurities (B, Al and the like) which act as an acceptor in silicon crystal from the TCS to an ultratrace level. In the present invention, the donor/acceptor eliminator 105 is provided in the circulation cycle for producing TCS, accordingly there is no need to take out a large amount of chlorosilane to the outside of the system when removing the donor impurities and the acceptor impurities from the process for producing TCS in order to highly purify the TCS, and consequently enhances the efficiency of the process for producing TCS.

There are adoptable methods for removing the impurities, which include: a method of removing impurities by producing an adduct with an organic substance containing an element having a lone electron-pair such as thiophenol and benzaldehyde (See U.S. Pat. No. 3,126,248 (Patent Document 3) and U.S. Pat. No. 3,252,752 (Patent Document 4));

a method of removing impurities through a chemical reaction of forming an Si—O—B bond or an Si—O—P bond in an atmosphere containing a very small amount of oxygen (See Japanese-Patent-Application No. 58-500895 (Patent Document 5));

a method of removing impurities by making the impurities contact with a metal oxide such as silica gel and alumina gel which are hydrated (See U.S. Pat. No. 4,112,057 (Patent Document 6));

a method of removing impurities by making the impurities contact with an aqueous solution of an inorganic salt such as $TiCl_4$ and $FeCl_3$ (See Japanese Patent Laid-Open No. 4-300206 (Patent Document 7));

a method of removing impurities by making the impurities contact with a fluoride salt of an alkali or alkaline earth element (See Japanese Patent Laid-Open No. 2001-2407 (Patent Document 8)); or a method of simultaneously non-volatilizing and fixing both impurities which act as a donor and an acceptor by dissolving oxygen into a chlorosilane liquid and making the impurities react with benzaldehyde.

The effluent containing TCS from which the donor and acceptor impurities have been removed is separated into a TCS fraction and a chlorosilane fraction containing hydrocarbons in the separator 102 so that the chlorosilane fraction containing hydrocarbons can be circulated and used.

These configuration examples only illustrate aspects of a process for producing TCS according to the present invention, and the present invention can include various aspects.

Example 1

Figure 3:
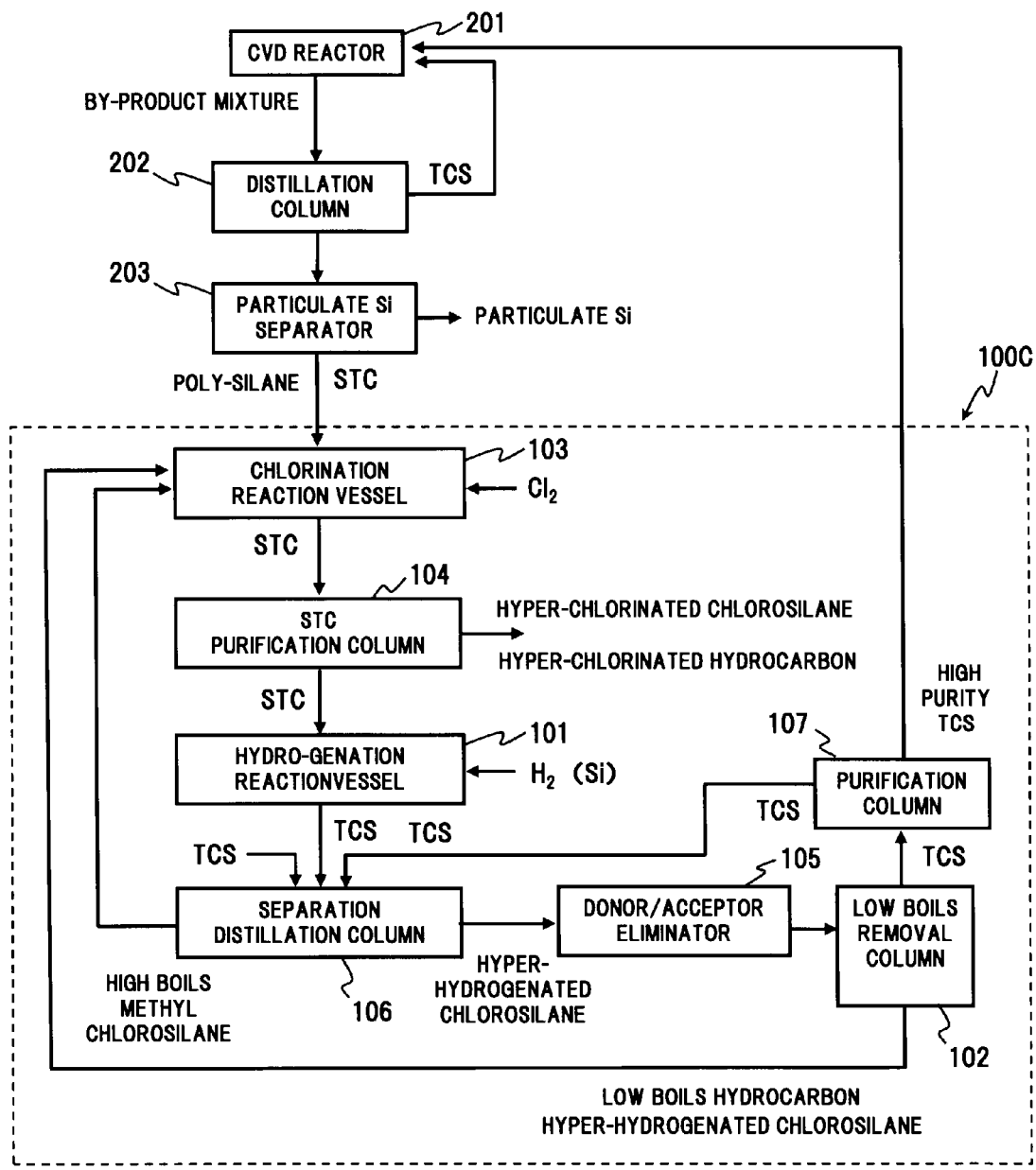
FIG. 3 is a view for describing an example of a process in a method for producing polycrystalline silicon according to the present invention.

FIG. 3 is a view for describing an example of a process for producing polycrystalline silicon by circulating and using TCS obtained with a method for producing TCS according to the present invention.

In this process, a by-product mixture produced in a CVD reactor 201 for depositing polycrystalline silicon is sent to a distillation column 202 and a particulate silicon separator 203, and STC and poly-silane contained in the by-product mixture sent from the CVD reactor 201 are supplied to a chlorination reaction vessel 103 in a process shown by 100C for producing TCS. Specifically, the STC and poly-silane contained in the by-product mixture sent from the CVD reactor 201 are supplied to a hydrogenation reaction vessel 101 through the chlorination reaction vessel 103.

At first, TCS and $H_2$ are supplied to a CVD reactor 201, in which polycrystalline silicon is deposited on a heated element. A by-product mixture which includes a mixture of low boils chlorosilanes represented by TCS and DCS remaining in an unreacting condition as a main component and STC, poly-silane, particulate silicon and the like as a minor component is discharged from the CVD reactor 201, and is supplied to a distillation column 202. The low boils effluent represented by TCS and DCS is distilled off from an upper part of the distillation column 202, is circulated to the CVD reactor 201, and is recycled as a raw material for use in depositing polycrystalline silicon.

On the other hand, a high boils fraction containing STC, poly-silane and particulate silicon is distilled off from the bottom of the distillation column 202, and is supplied to a particulate Si separator 203. The particulate silicon is removed from the high boils fraction, and a mixture of polysilane and STC in a liquid-phase state is supplied to the chlorination reaction vessel 103.

An effluent containing methyl chlorosilane (MeCS) having a high boiling point produced in a separation distillation column 106, a low boils hydrocarbon and an effluent containing a hyper-hydrogenated chlorosilane produced in a separator (low boils removal column) 102, and chlorine are supplied to the chlorination reaction vessel 103, and are chlorinated there according to the above described reaction formulae.

An effluent containing STC produced in the chlorination reaction vessel 103 is discharged to an STC purification column 104. Here, a hyper-chlorinated methyl chlorosilane and a hyper-chlorinated hydrocarbon are separated from the STC, and the STC is discharged to the hydrogenation reaction vessel 101.

In the hydrogenation reaction vessel 101, STC supplied from the STC purification column 104 and hydrogen (and silicon) supplied from the outside are reacted to convert approximately 15 to 30 mol % STC into TCS, for instance. A product produced in the hydrogenation reaction vessel 101 is supplied to the separation distillation column 106.

The separation distillation column 106 is a distillation column for separating an effluent produced in the hydrogenation step into an effluent containing methyl chlorosilane (MeCS) having a high boiling point and an effluent containing a hyperhydrogenated chlorosilane. To the separation distillation column 106, TCS is supplied from a purification column 107 and also from the outside of the system. From the top of the column, TCS containing hyper-hydrogenated silane of a higher order than DCS (effluent containing hyper-hydrogenated chlorosilane) is distilled off, and on the other hand, STC containing methyl chlorosilanes (MeCS) having a high boiling point and a small amount of TCS is distilled off from the bottom of the column. The latter is circulatingly supplied to the chlorination reaction vessel 103.

An effluent discharged from the top of the separation distillation column 106 (effluent containing hyper-hydrogenated chlorosilane) is sent to the donor/acceptor eliminator 105, and the impurities are removed there. Then, the treated liquid is continuously discharged to an evaporator (not-shown), and the evaporated chlorosilanes are subsequently supplied to the separator (low boils removal column) 102. In the low boils removal column 102, a fraction which contains some amount of TCS, hyper-hydrogenated chlorosilanes having a hydrogenation order in DCS or higher and a low boils hydrocarbon is distilled off, and is supplied to the chlorination reaction vessel 103. On the other hand, TCS is supplied to the purification column 107.

The purification column 107 has a role of final back up for assuring the quality of TCS though the quality may fluctuate according to the variation of an operation condition in upstream facilities, and finally distills off high purity TCS of a raw material for polycrystalline silicon from the top of the column. The high purity TCS is circulatingly supplied to the CVD reactor 201. In addition, a small amount of TCS is distilled off from the purification column 107 and is circulatingly supplied to the separation distillation column 106.

Polycrystalline silicon was produced according to the process illustrated in FIG. 3. In a CVD reactor 201, a by-product mixture was produced which included poly-silanes represented by a chemical formula $H_{2(n+1)-m}Cl_mSi_n$ (where n is an integer of 2 to 4 and m is an integer of 0 to 2(n+1)), and more specifically, included approximately 65 to 75 mol % of TCS, 25 to 35 mol % of STC, 0.1 to 2 mol % of DCS, 0.03 to 0.5 mol % of poly-silanes (mainly, $Si_2Cl_6$ and $Si_2HCl_5$) and a small amount of particulate silicon. The by-product mixture was supplied to a distillation column 202. There, TCS was distilled off as overhead, was circulatingly supplied to the CVD reactor 201, and was recycled as a raw material for the deposition of polycrystalline silicon.

A high boils fraction including STC, poly-silane and particulate silicon in the by-product mixture was supplied to a particulate Si separator 203, and was subjected to separation treatment under the conditions of a little number of trays, a little reflux ratio and a small quantity of evaporation, in such a range that the solid content could not be distilled off from the top of the column and the poly-silane could be discharged as the overhead effluent.

From the particulate Si separator 203, the overhead fraction including 99 mol % of STC and the balance poly-silane (poly-silane of approximately 90 mol % supplied to separator 203) was supplied to a chlorination reaction vessel 103. A sample port was placed in a flow line between the particulate Si separator 203 and the chlorination reaction vessel 103, and samples were periodically withdrawn for analysis through gas chromatography and visual observation. The withdrawn sample contained precisely 0.16 to 0.26 mol % of poly-silane and was confirmed not to contain particulate silicon.

This fraction, an STC effluent containing approximately 0.01 mol % methyl chlorosilane produced in a separation distillation column 106 and a low boils hydrocarbon containing approximately 60% TCS produced in a low boils separation column 102 and a hyper-hydrogenated chlorosilane effluent were supplied to the chlorination reaction vessel 103, and were chlorinated there according to the above described method.

The chlorination reaction vessel 103 had: a jacket and an external circulating cooling system for removing the heat of reaction; an absorption column for absorbing unreacted chlorine with an introduced liquid of a raw material; and a stripping column for stripping chlorine gas, and introducing the chlorine gas again to the chlorination reaction vessel 103 circulatingly. The compounds were chlorinated by being irradiated with light emitted from four tubes of 2 kW high-pressure mercury lamps. The photo-chlorination reaction was conducted in a liquid phase under the conditions of a temperature of 30° C. and a reaction pressure of 0.02 Mpag.

A reaction effluent produced in the chlorination reaction vessel 103 was supplied to the STC purification column 104. From the top of the STC purification column 104, STC was distilled off which did not contain a hyper-chlorinated methyl chlorosilane, and was supplied to a hydrogenation reaction vessel 101. On the other hand, from the bottom of the STC purification vessel 104, the hyper-chlorinated methyl chlorosilane containing approximately 80 mol % STC and a chlorinated hydrocarbon were distilled off to the outside of the system. The amount of the STC distilled off to the outside of the system was a very small amount corresponding to 0.03% of STC supplied to the STC purification column 104.

In the hydrogenation reaction vessel 101, STC supplied from the STC purification vessel 104 was reacted with metallurgical silicon and hydrogen under the conditions of 550° C. and 2.5 Mpag. As a result, approximately 70 mol % of unreacted STC and a TCS product containing approximately 1 mol % of hyper-hydrogenated chlorosilane were obtained.

The TCS product was supplied to the separation distillation column 106, and was mixed with a TCS effluent supplied from the bottom of a purification column 107 and TCS supplied from the outside of the system. Then, the mixture was distilled and separated. From the top of the separation distillation column 106, TCS containing approximately 4 mol % of hyper-hydrogenated chlorosilane was distilled off and was sent to a donor/acceptor eliminator 105. In the vessel provided with a stirrer, donor/acceptor impurities were fixed as a high-boiling point adduct by introducing benzaldehyde into the vessel at a rate of 1 kg/hr while blowing a nitrogen gas containing 1.6 vol % oxygen by concentration into the vessel, at a reaction temperature of 30° C. under a reaction pressure of 0.2 Mpag for a residence time of 1 hour.

The effluent from which the impurities had been removed was sent to an evaporator (not shown) and evaporated. Then, the vapor was supplied to the low boils removal column 102 in a vapor state. From the bottom of the evaporator, STC effluent containing approximately 0.01 mol % methyl chlorosilane was distilled off and was circulatingly supplied to the chlorination reaction vessel 103.

In the low boils removal column 102, a hyper-hydrogenated chlorosilane containing approximately 60 mol % of TCS was distilled off from the top of the column, and was supplied to the chlorination reaction vessel 103. TCS was distilled off from the bottom of the column, and was supplied to the purification column 107.

In the purification column 107, approximately 3% of supplied TCS was distilled off from the bottom of the column, and was circulatingly supplied to the separation distillation column 106. From the top of the column, the purified high purity TCS was distilled off, was supplied to the CVD reactor 201, and was recycled as a raw material for use in depositing polycrystalline silicon.

Polycrystalline silicon obtained from the high-purity TCS distilled off from the top of the above described purification column 107 through a deposition step by the Siemens method was high-purity polycrystalline silicon containing impurities of 0.021 ppba of a donor, 0.007 ppba of an acceptor and 0.014 ppma of carbon by concentration.

Example 2

In the present example, an example of only a photo-chlorination step will now be described.

A mixture liquid with a composition of 96.1 wt % STC, 3.3 wt % TCS, 0.3 wt % DCS, 0.2 wt % hexachlorodisilane, 85 ppm methyl dichlorosilane, 30 ppm methyl trichlorosilane and 5 ppm isopentane was subjected to the photo-chlorination step of irradiating the mixture liquid with a light of a high-pressure mercury lamp at a temperature of 23° C. under atmospheric pressure for two hours while introducing chlorine gas into the mixture liquid.

As a result of having measured composition of the mixture liquid which had been treated in the photo-chlorination step, with gas chromatography, the mixture liquid showed the composition of 99.895 wt % STC, 0.1 wt % TCS, 0.002 wt % DCS and 0.001 wt % hexachlorodisilane and did not contain a detectable amount of methyl dichlorosilane, methyl trichlorosilane and isopentane.

As described above, the present invention provides a method which can produce high-purity trichlorosilane (TCS) particularly from a by-product produced through a deposition reaction of polycrystalline silicon, and can further enhance a yield in a process for producing the polycrystalline silicon.

What is claimed is:

1. A method for producing trichlorosilane, comprising:
   reacting tetrachlorosilane with hydrogen to form trichlorosilane by hydrogenation of tetrachlorosilane;
   separating an effluent produced during said reacting into a chlorosilane fraction and a trichlorosilane fraction, said chlorosilane fraction comprising a hydrocarbon and hyper-hydrogenated chlorosilane;
   chlorinating said chlorosilane fraction by reaction with a chlorinating agent to form a fraction comprising chlorinated hydrocarbon and tetrachlorosilane;
   upon said chlorinating, recycling the tetrachlorosilane produced by said chlorinating into said reacting; and
   upon said chlorinating, separating the tetrachlorosilane produced during said chlorinating from the chlorinated hydrocarbon.

2. The method according to claim 1, further comprising removing a donor impurity and an acceptor impurity present in the effluent prior to said separating.

3. The method according to claim 1, wherein said chlorination agent is chlorine gas.

4. The method according to claim 1, wherein said chlorinating occurs by photo-chlorinating the hydrocarbon and the hyper-hydrogenated chlorosilane.

5. The method according to claim 1, wherein the hyper-hydrogenated chlorosilane is selected from the group consisting of $SiH_4$, $SiH_3Cl$, $SiH_2Cl_2$, $SiHCl_3$, and a mixture thereof.

6. A method for producing polycrystalline silicon, comprising
   reacting trichlorosilane produced during the method according to claim 1 with hydrogen to deposit polycrystalline silicon on a base material, and
   further chlorinating poly-silane represented by a chemical formula:

$H_{2(n+1)-m}Cl_mSi_n$ during said chlorinating,
   wherein n is an integer of 2 to 4 and m is an integer of 0 to 2(n+1).

7. The method according to claim 1, wherein said reacting occurs at a temperature of from 400 to 600° C.

8. The method according to claim 1, further comprising supplying silicon during said reacting.

9. The method according to claim 1, wherein said chlorinating occurs in a liquid phase at a temperature of from 20 to 100° C.

10. The method according to claim 1, wherein said chlorinating occurs in a gas phase at a temperature of 400° C. or greater.

11. The method according to claim 1, wherein the hydrocarbon has 5 carbon atoms.

12. The method according to claim 1, wherein the hydrocarbon is isopentane having a boiling point of 30° C., which is close to the known boiling point of trichlorosilane.

13. The method according to claim 1, wherein said chlorinated hydrocarbon comprises at least one of I and II

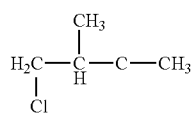

I

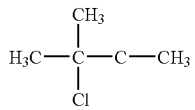

II wherein I has a boiling point of 100° C. and II has a boiling point of 85° C.

14. The method according to claim 1, wherein said hydrocarbon is present in an amount of at least 5 ppm prior to said chlorinating.

15. The method according to claim 1, wherein said fraction comprising chlorinated hydrocarbon and tetrachlorosilane of said chlorinating comprises at least 99.895 wt % of tetrachlorosilane.

16. The method according to claim 1, wherein said reacting occurs in the presence of a fluidized bed.

* * * * *